United States Patent
Han et al.

(10) Patent No.: US 9,324,989 B2
(45) Date of Patent: Apr. 26, 2016

(54) RECHARGEABLE BATTERY INCLUDING EXTERNAL SHORT-CIRCUIT MEMBER

(71) Applicant: SAMSUNG SDI CO., LTD., Yongin-si, Gyeonggi-do (KR)

(72) Inventors: Min-Yeol Han, Yongin-si (KR); Min-Hyung Guen, Yongin-si (KR); Sang-Won Byun, Yongin-si (KR); Hae-Kwon Yoon, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 177 days.

(21) Appl. No.: 14/156,285

(22) Filed: Jan. 15, 2014

(65) Prior Publication Data
US 2015/0079429 A1 Mar. 19, 2015

(30) Foreign Application Priority Data
Sep. 13, 2013 (KR) .................... 10-2013-0110406

(51) Int. Cl.
*H01M 2/34* (2006.01)
*H01M 10/42* (2006.01)
*H01M 2/02* (2006.01)
*H01M 2/04* (2006.01)

(52) U.S. Cl.
CPC ............ *H01M 2/345* (2013.01); *H01M 10/425* (2013.01); *H01M 2/02* (2013.01); *H01M 2/0404* (2013.01); *H01M 2200/20* (2013.01)

(58) Field of Classification Search
CPC . H01M 2/345; H01M 2/1229; H01M 2/0404; H01M 2/1241; H01M 10/425
See application file for complete search history.

(56) References Cited

U.S. PATENT DOCUMENTS

| | | | | |
|---|---|---|---|---|
| 2005/0069760 | A1* | 3/2005 | Somatomo | H01M 2/1229 429/56 |
| 2006/0216592 | A1* | 9/2006 | Chun | H01M 2/0404 429/175 |
| 2008/0145748 | A1* | 6/2008 | Jung | H01M 2/1241 429/56 |
| 2011/0244280 | A1* | 10/2011 | Byun | H01M 2/0404 429/61 |
| 2011/0268999 | A1 | 11/2011 | Nagai | |
| 2012/0141845 | A1 | 6/2012 | Byun et al. | |
| 2013/0029189 | A1 | 1/2013 | Kim | |

FOREIGN PATENT DOCUMENTS

| | | |
|---|---|---|
| EP | 2 461 393 A1 | 6/2012 |
| EP | 2 551 935 A1 | 1/2013 |
| KR | 10-2012-0060724 A | 6/2012 |
| KR | 10-2013-0014334 A | 2/2013 |

OTHER PUBLICATIONS

EPO Search Report dated Jan. 22, 2015, for corresponding European Patent application 14162286.0 (7 pages).

* cited by examiner

*Primary Examiner* — Kenneth Douyette
(74) *Attorney, Agent, or Firm* — Lewis Roca Rothgerber Christie LLP (57) ABSTRACT

A rechargeable battery includes: an electrode; a case accommodating the electrode assembly therein; a cap plate closing an opening of the case; a first electrode terminal and a second electrode terminal extending through the cap plate and coupled to the electrode assembly; and an external short-circuiter including a membrane closing and sealing a short-circuit opening in the cap plate and coupled to the second electrode terminal, and a short-circuit tab coupled to the first electrode terminal and separated from the membrane, wherein the cap plate includes a bending inducement groove formed at the second electrode terminal.

11 Claims, 9 Drawing Sheets

RECHARGEABLE BATTERY INCLUDING EXTERNAL SHORT-CIRCUIT MEMBER

CROSS-REFERENCE TO RELATED APPLICATIONS

This application claims priority to and the benefit of Korean Patent Application No. 10-2013-0110406, filed in the Korean Intellectual Property Office on Sep. 13, 2013, the entire contents of which are incorporated herein by reference.

BACKGROUND

1. Field

The present disclosure relates to a rechargeable battery including an external short-circuiter.

2. Description of the Related Art

A rechargeable battery is a battery that is designed to be repeatedly charged and discharged, unlike a primary battery. A low-capacity rechargeable battery is used in, for example, small portable electronic devices such as a mobile phone, a notebook computer, and a camcorder, and a large-capacity rechargeable battery is used, for example, as a power supply for driving a motor such as for a hybrid car.

The rechargeable battery includes an electrode assembly having a separator and a positive electrode and a negative electrode provided on opposite surfaces of the separator, a case accommodating the electrode assembly therein, a cap plate sealing an opening of the case, and a positive electrode terminal and a negative electrode terminal installed in and extending through the cap plate and electrically coupled to the electrode assembly.

The rechargeable battery may positively electrify (e.g., positively bias) a cap plate and may include an external short-circuiter (e.g., an external short-circuit member) between the negative electrode terminal and the cap plate. When an internal pressure of the rechargeable battery reaches a reference level (e.g., a predetermined level), the external short-circuiter may operate. In other words, the external short-circuiter is configured to (e.g., serves to) discharge a current charged in the electrode assembly to the outside of the electrode assembly.

For example, the external short-circuiter may include a short-circuit tab coupled to the negative electrode terminal and a membrane which maintains a state in which it is separated from the short-circuit tab, is coupled to (e.g., connected to) the cap plate, and may become inverted to come into contact with the short-circuit tab. The cap plate and the membrane may be coupled to (e.g., connected to) the positive electrode terminal.

When rechargeable batteries are connected in parallel or overcharged, an external short-circuit may occur or may be generated, which may cause a malfunction of the membrane due to an overcurrent. For example, after the membrane and the short-circuit tab are short-circuited (e.g., come into contact with each other), excess heat may be generated in short-circuited portions thereof due to the overcurrent. Accordingly, the short-circuit tab may melt or the membrane may break.

The above information disclosed in this Background section is only for enhancement of understanding of the background of the described technology and therefore it may contain information that does not form the prior art that is already known in this country to a person of ordinary skill in the art.

SUMMARY

Aspects of embodiments of the present invention are directed toward a rechargeable battery capable of preventing malfunctioning of a membrane caused by overcurrent when an external short-circuiter is operated. Further, aspects of embodiments of the present invention are directed toward a rechargeable battery capable of preventing malfunctioning of a membrane caused by arcs in a state where a membrane and a short-circuit tab are short-circuited when an internal pressure of the rechargeable battery is increased.

According to an example embodiment, a rechargeable battery includes: an electrode assembly; a case accommodating the electrode assembly therein; a cap plate closing an opening of the case; a first electrode terminal and a second electrode terminal extending through the cap plate and coupled to the electrode assembly; and an external short-circuiter including a membrane closing and sealing a short-circuit opening in the cap plate and coupled to the second electrode terminal, and a short-circuit tab coupled to the first electrode terminal and separated from the membrane, wherein the cap plate includes a bending inducement groove formed at the second electrode terminal.

The first electrode terminal may be a negative electrode terminal and the second electrode terminal may be a positive electrode terminal.

The second electrode terminal may include a rivet terminal at a terminal opening in the cap plate, a flange inside the cap plate and coupled to the rivet terminal, a plate terminal outside the cap plate and coupled to the rivet terminal, and a top plate between the plate terminal and the cap plate.

The inducement groove may include a first inducement groove and a second inducement groove which are respectively formed at opposite sides of the terminal opening along a longitudinal direction of the cap plate.

The first and second bending inducement grooves may extend along a width direction of the cap plate substantially parallel to the longitudinal direction thereof.

The first inducement groove and the second inducement groove may be formed in parallel with an internal surface of the top plate.

Each of the internal surfaces of the first inducement groove and the second inducement groove may have a notch.

The first inducement groove and the second inducement groove may be respectively formed parallel with sides of the top plate.

The rechargeable battery may further include a second electrode lead tab coupled to a lower end of the rivet terminal, wherein the second electrode lead tab may include a current collecting portion coupled to an uncoated region of the electrode assembly, and a connection portion extending substantially perpendicularly from the current collecting portion and coupled to the second electrode terminal, wherein the connection portion may have fuses at opposite sides of a first through-hole that correspond to the second inducement groove.

The rechargeable battery may further include an internal insulator between the second electrode lead tab and the cap plate, wherein the internal insulator may have a second through-hole which allows the second inducement groove and the first through-hole to communicate with each other.

The bending inducement groove may be formed to have a quadrangular shape along a width direction of the cap plate and along a longitudinal direction thereof that is substantially perpendicular to the width direction.

According to aspects of embodiments of the rechargeable battery, an initial current value may be reduced to a level (e.g., a specific level) when the membrane and the short-circuit tab are short-circuited (e.g., connected) by increasing resistance between the second electrode terminal and the cap plate. Accordingly, it is possible to prevent malfunctioning of the membrane caused by arcs when the membrane and the short-circuit tab are short-circuited (e.g., connected to each other). In other words, when rechargeable batteries are connected in parallel or overcharged and an external short-circuit is generated, a malfunction of the membrane may be prevented by reducing an initial current value to a specific level.

DETAILED DESCRIPTION

Hereinafter, example embodiments will be described in detail with reference to the attached drawings such that the present invention can be easily put into practice by those skilled in the art. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

In the drawings, the thickness of layers, films, panels, regions, etc. may be exaggerated for clarity. It will be understood that when an element such as a layer, film, region, or substrate is referred to as being "on" another element, it may be directly on the other element or intervening elements may also be present. When an element is referred to as being "directly on" another element, there are no intervening elements present. Expressions, such as "at least one of," when preceding a list of elements modify the entire list of elements and do not modify the individual elements of the list. As used herein, the term "and/or" includes any and all combinations of one or more of the associated listed items. Further, the use of "may" when describing embodiments of the present invention refers to "one or more embodiments of the present invention."

Figure 1:
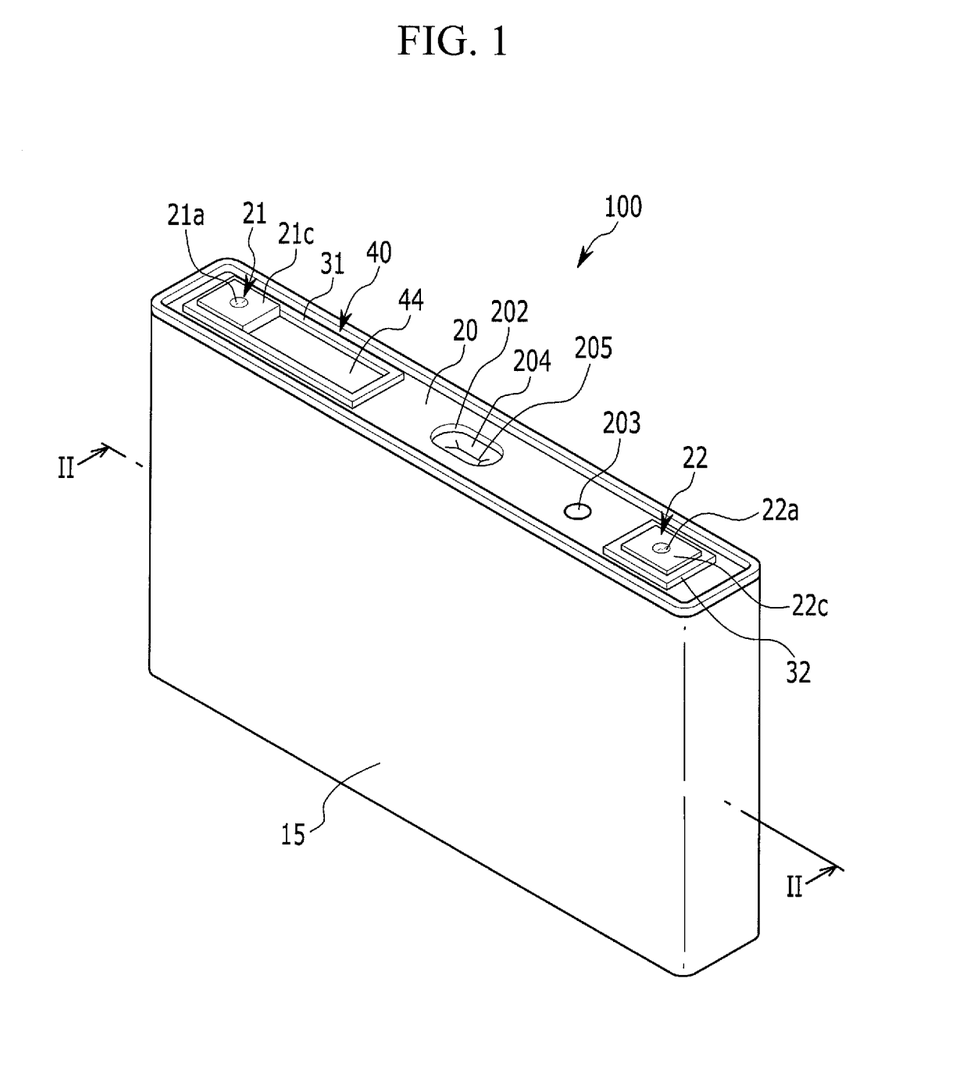
FIG. 1 is a perspective view showing a rechargeable battery in accordance with a first example embodiment.
Figure 2:
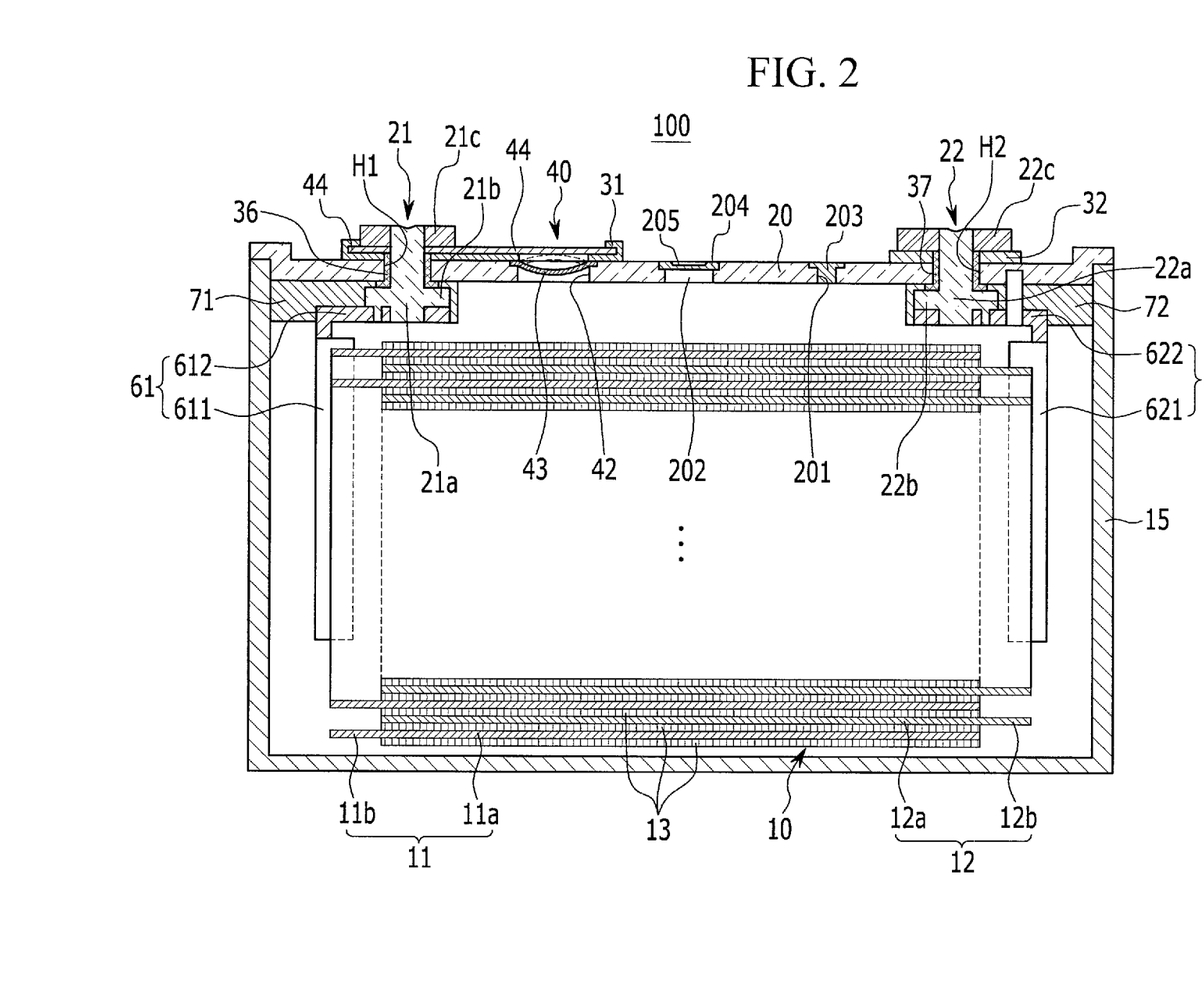
FIG. 2 is a cross-sectional view of the rechargeable battery taken along the line II-II of FIG. 1.

FIG. 1 is a perspective view showing a rechargeable battery 100 in accordance with a first example embodiment, and FIG. 2 is a cross-sectional view of the rechargeable battery 100 taken along the line II-II of FIG. 1. Referring to FIG. 1 and FIG. 2, the rechargeable battery 100 of the first example embodiment includes an electrode assembly 10 for performing charging and discharging operations; a case 15 for accommodating the electrode assembly 10 therein; a cap plate 20 for closing and sealing an opening of the case 15; a negative electrode terminal 21 and a positive electrode terminal 22 respectively mounted in terminal holes H1 and H2 of the cap plate 20 to be coupled to (e.g., connected to) the electrode assembly 10; and an external short-circuiter 40 (e.g., an external short-circuit member) for coupling or decoupling (e.g., electrically connecting or disconnecting) the cap plate 20 and the negative electrode terminal 21 to or from each other. The cap plate 20 may be coupled to (e.g., electrically connected to) the positive electrode terminal 22.

The electrode assembly 10 may be formed by disposing a negative electrode 11 and a positive electrode 12 on opposite surfaces of a separator 13 serving as an insulator, and winding the negative electrode 11, the separator 13, and the positive electrode 12 in, for example, a jelly-roll shape.

The negative and positive electrodes 11 and 12 include coated regions 11a and 12a, respectively, formed by applying an active material to a current collector of a metal plate, and uncoated regions 11b and 12b, respectively, which are exposed portions of the current collector to which the active material is not applied.

The uncoated region 11b of the negative electrode 11 is formed at one end of the wound negative electrode 11 along the electrode assembly 10. The uncoated region 12b of the positive electrode 12 is formed at another end of the wound positive electrode 12 along the electrode assembly 10. As a result, the uncoated regions 11b and 12b of the negative electrode 11 and the positive electrode 12 are respectively disposed at opposite ends of the electrode assembly 10.

For example, the case 15 may be configured to have a substantially cubic shape to form a space for receiving the electrode assembly 10 and an electrolyte solution, and an opening connecting an inner space to the outside is formed at one side of the cuboid. The opening enables the electrode assembly 10 to be inserted into the case 15.

The cap plate 20 may be formed of a thin plate and coupled to (e.g., welded to) the opening of the case 15 to close and seal the case 15. The cap plate 20 may include an electrolyte injection opening 201 (e.g., an electrolyte injection hole), a vent opening 202 (e.g., a vent hole), and a short-circuit opening 42 (e.g., a short-circuit hole).

After the cap plate 20 is coupled to (e.g., welded to) the case 15, the electrolyte injection opening 201 is utilized to inject the electrolyte solution into the case 15. After the electrolyte solution is injected, the electrolyte injection opening 201 is sealed by a sealing cap 203.

The vent opening 202 is closed and sealed with a vent plate 204 so that internal pressure of the rechargeable battery 100 may be contained. If the internal pressure of the rechargeable battery 100 reaches a reference level (e.g., a predetermined level), the vent plate 204 may rupture to open the vent opening 202 and discharge the internal pressure. A notch 205 for inducing the rupture may be formed in the vent plate 204.

The negative and positive electrode terminals 21 and 22 are mounted in the cap plate 20, extend therethrough, and are coupled to (e.g., electrically connected to) the electrode assembly 10. For example, the negative electrode terminal 21 is coupled to (e.g., electrically connected to) the negative electrode 11 of the electrode assembly 10, and the positive electrode terminal 22 is coupled to (e.g., electrically connected to) the positive electrode 12 of the electrode assembly 10. Accordingly, the electrode assembly 10 is drawn outside the case 15 through the negative electrode terminal 21 and the positive electrode terminal 22.

The negative and positive electrode terminals 21 and 22 respectively include rivet terminals 21a and 22a mounted in the terminal openings H1 and H2 (e.g., terminal holes) of the cap plate 20, flanges 21b and 22b formed in (e.g., integrally and widely formed in) the rivet terminals 21a and 22a at an inner side of the cap plate 20, and plate terminals 21c and 22c coupled to (e.g., connected to) the rivet terminals 21a and 22a which are disposed at the outer side of the cap plate 20 through, for example, riveting or welding.

Negative and positive electrode gaskets 36 and 37 are respectively inserted between the rivet terminals 21a and 22a of the negative and positive electrode terminals 21 and 22 and internal surfaces of the terminal openings H1 and H2 of the cap plate 20 to seal a gap between the rivet terminals 21a and 22a and the cap plate 20. The negative and positive electrode gaskets 36 and 37 respectively extend between the rivet terminals 21b and 22b and an internal surface of the cap plate 20 to further seal the gap between the rivet terminals 21a and 22a and the cap plate 20.

Negative and positive lead tabs 61 and 62 respectively couple (e.g., electrically connect) the negative and positive electrode terminals 21 and 22 to the negative and positive electrodes 11 and 12 of the electrode assembly 10. For example, the negative and positive electrode lead tabs 61 and 62 respectively include a current collecting portion 611 and 621, which are bent, and connection portions 612 and 622. The current collecting portions 611 and 621 are respectively coupled to (e.g., connected to and/or welded to) the uncoated regions 11b and 12b of the electrode assembly 10, and the connection portions 612 and 622 are respectively coupled to (e.g., connected to) the rivet terminals 21a and 22a.

For example, the connection portions 612 and 622 of the negative and positive lead tabs 61 and 62 are respectively coupled to (e.g., connected to) the lower ends of the rivet terminals 21a and 22a in a conductive structure while being supported by the flanges 21b and 22b. By coupling the connection portions 612 and 622 of the lead tabs 61 and 62 to the lower ends of the rivet terminals 21a and 22a, the lower ends thereof may be sealed (e.g., caulked).

Internal insulators 71 and 72 are respectively mounted between the connection portions 612 and 622 of the negative and positive lead tabs 61 and 62 and the cap plate 20 to electrically insulate the connection portions 612 and 622 of the negative and positive lead tabs 61 and 62 from the cap plate 20. In addition, one side of each of the internal insulators 71 and 72 is adhered to the cap plate 20 and the other side thereof surrounds the connection portions 612 and 622 of the negative and positive lead tabs 61 and 62, the rivet terminals 21a and 22a, and the flanges 21b and 22b, thereby stabilizing a connection structure thereof.

The positive electrode terminal 22 further includes a top plate 32 provided between the plate terminal 22c and the cap plate 20. The positive electrode gasket 37 is extended and inserted between the rivet terminal 22a of the positive electrode terminal 22 and the top plate 32 to prevent the rivet terminal 22a and the top plate 32 from being electrically connected to (e.g., directly electrically connected to) each other. In other words, the rivet terminal 22a is coupled to (e.g., electrically connected to) the top plate 32 through the plate terminal 22c. Accordingly, the top plate 32, the cap plate 20, and the case 15 are coupled to (e.g., electrically connected to) the positive electrode terminal 22 so as to be positively electrified.

The negative electrode gasket 36 is extended and inserted between the rivet terminal 21a of the negative electrode terminal 21 and the external short-circuiter 40 (e.g., extends in an opening in a negative electrode insulator 31 which corresponds to the terminal opening H1). The external short-circuiter 40 is configured to maintain a disconnection state or to be short-circuited according to the internal pressure of the rechargeable battery 100.

For example, the external short-circuiter 40 may include a membrane 43 for closing and sealing the short-circuit opening 42 formed in the cap plate 20 and that may be inverted according to the internal pressure of the rechargeable battery 100 and a short-circuit tab 44 coupled to (e.g., electrically connected to) the negative electrode terminal 21 and separately disposed at one side of (e.g., above) the membrane 43. The membrane 43 may be coupled to (e.g., welded to) the short-circuit opening 42 to close and seal the short-circuit opening 42. The short-circuit tab 44 may be provided between the negative electrode insulator 31 and the plate terminal 21c. When the rechargeable battery 100 is normally operated, the short-circuit tab 44 maintains a disconnection state from the membrane 43.

For example, the short-circuit tab 44 may be made of nickel or stainless steel. In this case, the membrane 43 may be made of aluminum which may be the same material as that of the cap plate 20.

The cap plate 20 may be positively electrified (e.g., positively biased), and thus each of the short-circuit tab 44 of the external short-circuiter 40 and the plate terminal 21c of the negative electrode terminal 21 is mounted on the cap plate 20 via the negative electrode insulator 31. The negative electrode insulator 31 may have openings (e.g., holes) corresponding to the terminal opening H1 and the short-circuit opening 42 to avoid interference with the mounting of the rivet terminal 21a and the inverting of the membrane 43.

Figure 3:
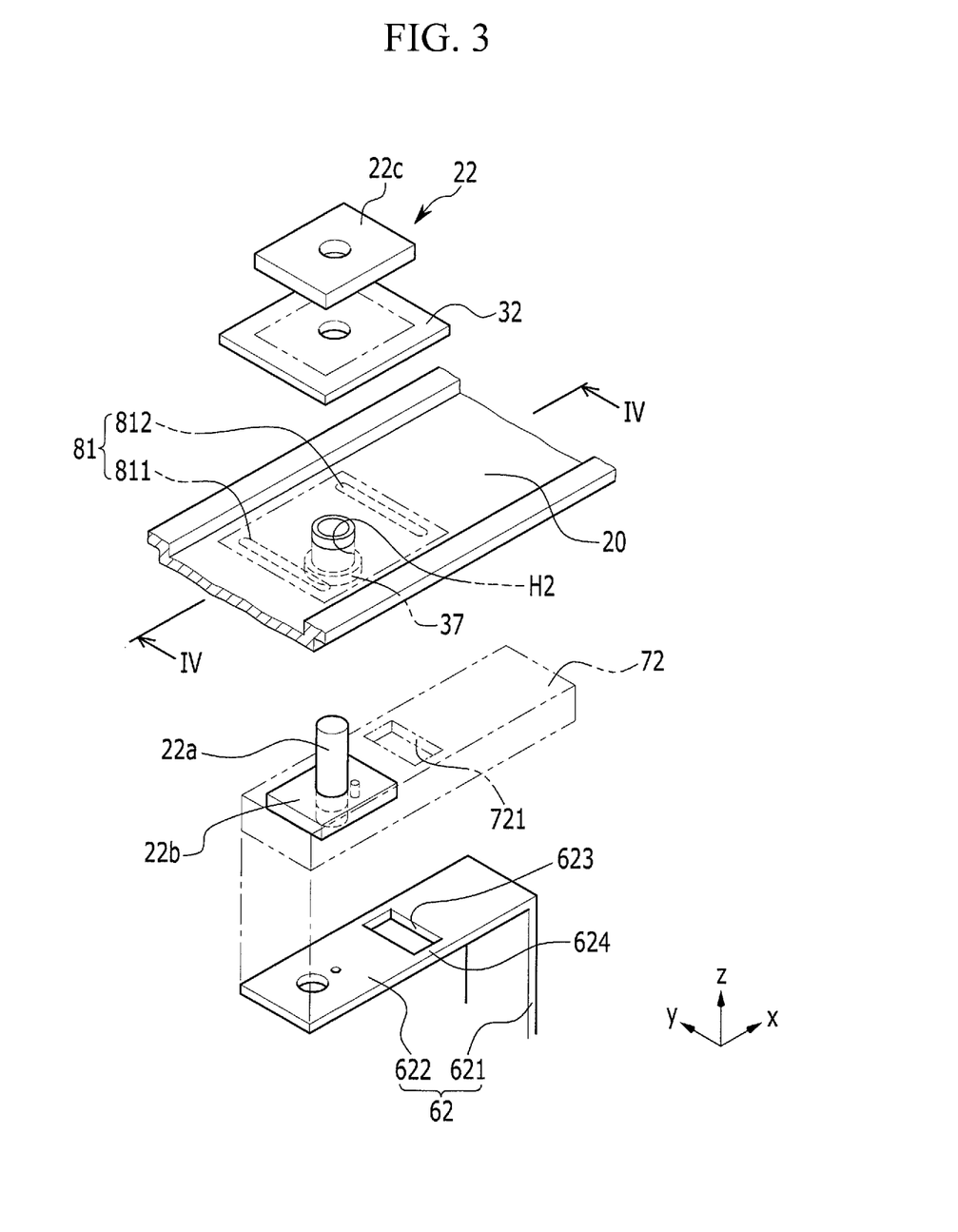
FIG. 3 is an exploded perspective view showing a positive electrode terminal shown in FIG. 2.
Figure 4:
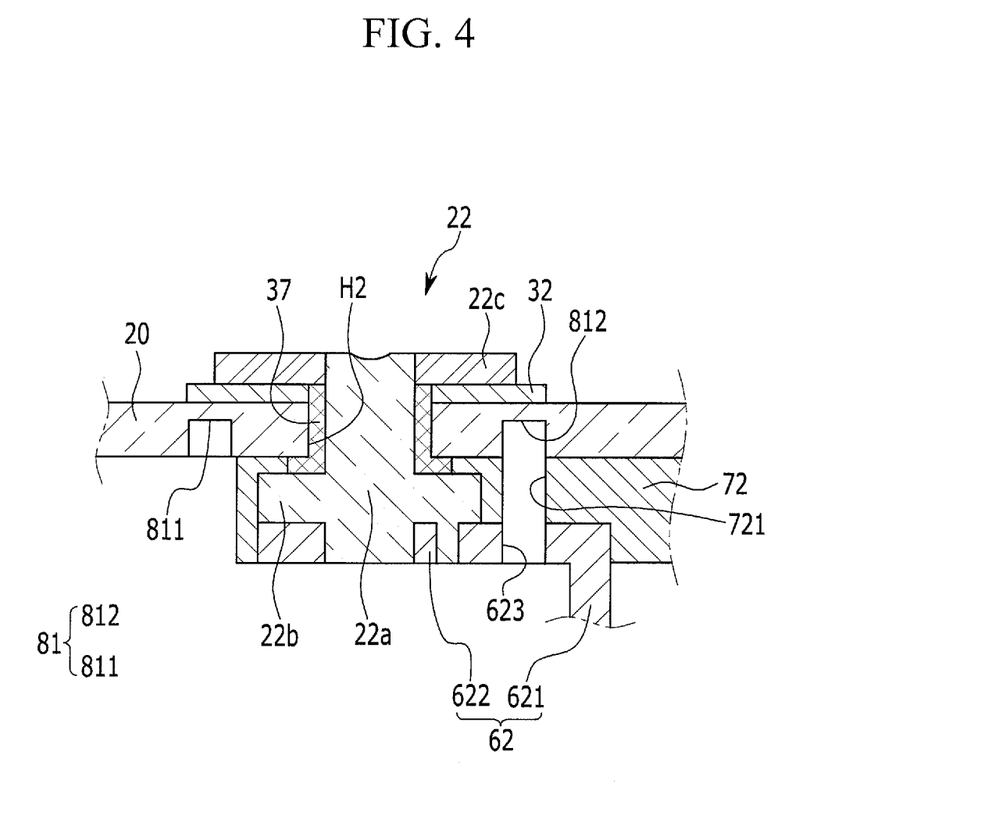
FIG. 4 is a cross-sectional view of the rechargeable battery taken along the line IV-IV of FIG. 3.

FIG. 3 is an exploded perspective view showing the positive electrode terminal 22 shown in FIG. 2, and FIG. 4 is a cross-sectional view of the rechargeable battery 100 taken along the line IV-IV of FIG. 3. Referring to FIG. 3 and FIG. 4, the cap plate 20 may include a bending inducement groove 81 laterally formed at an internal surface of the positive electrode terminal 22.

The bending inducement groove 81 may include a first inducement groove 811 and a second inducement groove 812 respectively formed at opposite sides of the terminal opening H2 along a longitudinal direction (e.g., an x-axis direction) of the cap plate 20. In other words, along an internal surface of the cap plate 20, the first inducement groove 811 and the second inducement groove 812 are less-strong portions (e.g., weaker portions) of the cap plate 20 and are formed at opposite sides of the terminal opening H2.

Further, the bending inducement groove 81 (e.g., the first and second inducement grooves 811 and 812) may be formed to extend along a width direction (e.g., a y-axis direction) of the cap plate 20 intersecting (e.g., substantially perpendicular to) the longitudinal direction thereof. Accordingly, when the internal pressure of the rechargeable battery 100 is increased, the cap plate 20 may bend at or along the first and second inducement grooves 811 and 812.

The connection portion 622 of the positive electrode lead tab 62 may include a first through-hole 623 corresponding to the second inducement groove 812. Accordingly, the connection portion 622 may include fuses 624 (e.g., fuse portions) respectively provided at opposite sides of the first through-hole 623.

The internal insulator 72 may include a second through-hole 721 corresponding to the second inducement groove 812 formed in the internal surface of the cap plate 20 and corresponding to the first through-hole 623 of the positive electrode lead tab 62. The second through-hole 721 may be coupled to (e.g., connected to) the first through-hole 623 to enable the internal pressure to reach the second inducement groove 812 of cap plate 20 (e.g., the second through-hole 721 may allow the first through-hole 623 and the second inducement groove 812 to communicate with each other).

The first inducement groove 811 of the cap plate 20 may be exposed to (e.g., directly exposed to) an internal space (e.g., an inner space) of the case 15 without being shielded by the positive electrode lead tab 62 and/or the internal insulator 72. Accordingly, the internal pressure may directly reach the first inducement groove 811 of the cap plate 20.

Each internal surface of the first inducement groove 811 and the second inducement groove 812 may be formed in parallel with an internal surface of the top plate 32, and may be formed in parallel with sides of the top plate 32. In other words, because the first and second inducement grooves 811 and 812 may have a relatively thin thickness as compared with other portions of the cap plate 20, it is possible to set or determine an internal pressure at which the cap plate 20 may bend.

Figure 5:
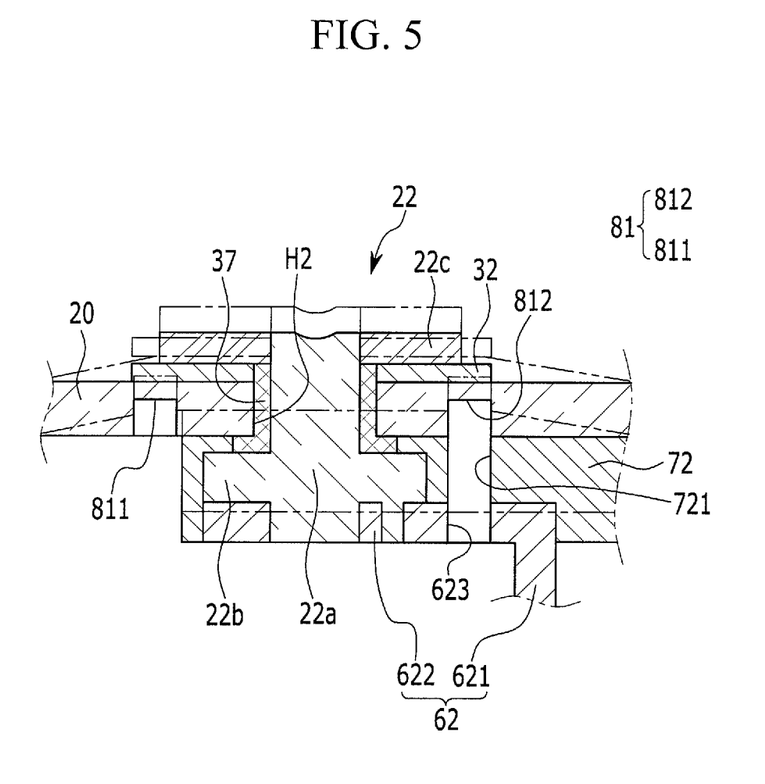
FIG. 5 is a cross-sectional view showing the rechargeable battery shown in FIG. 4 in a state in which an internal pressure is increased (e.g., changed from a normal operation state).
Figure 6:
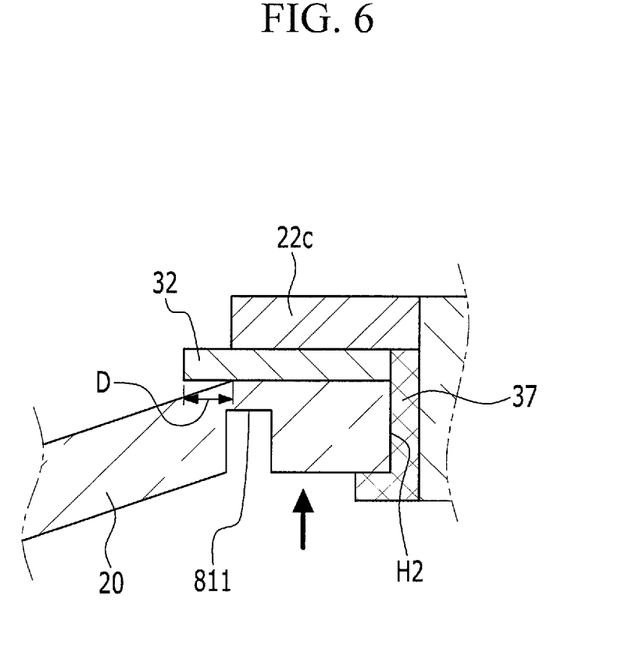
FIG. 6 is a cross-sectional view showing the rechargeable battery shown in FIG. 5 in which a positive electrode terminal is partially separated from the cap plate.

FIG. 5 is a cross-sectional view showing the rechargeable battery 100 shown in FIG. 4 in a state in which an internal pressure is increased (e.g., changed from a normal operation state), and FIG. 6 is a cross-sectional view showing the rechargeable battery 100 of FIG. 5 in which the positive electrode terminal 22 is partially separated from the cap plate.

When the rechargeable battery 100 is normally operated, the cap plate 20 and the top plate 32 are coupled to (e.g., connected to) each other while coming into surface contact with each other as indicated by the solid line in FIG. 5. In other words, the cap plate 20 and the top plate 32 of the positive electrode terminal 22 are coupled to (e.g., connected to) each other in a low resistance state.

When the internal pressure of the rechargeable battery 100 is increased from a normal state, the increased internal pressure reaches the first and second inducement grooves 811 and 812. Accordingly, the cap plate 20 may bend at or along the first and second inducement grooves 811 and 812 as indicated by the imaginary line in FIG. 5 and as shown in FIG. 6.

The top plate 32 may be spaced from (e.g., partially spaced from) the cap plate 20 by being separated from the cap plate 20 by a distance D along an outer circumference thereof. The cap plate 20 and the top plate 32 of the positive electrode terminal 22 are coupled to (e.g., connected to) each other while being changed from a low resistance state to a high resistance state.

When an external short-circuit is generated (e.g., when a short-circuit is generated between the short-circuit tab 44 and the membrane 43) after the internal pressure is increased due to parallel connection or overcharge of rechargeable batteries 100, the current charged in the electrode assembly 10 is discharged in or through the external short-circuiter 40.

An initial current value is reduced to a certain level due to the relatively high electrical resistance between the cap plate 20 and the top plate 32 that is changed due to bending of the cap plate 20. Accordingly, as a maximum current value is reduced and then an average current value is maintained, the fuse 624 may melt, thereby obtaining safety of the rechargeable battery 100. Further, the membrane 43 may be prevented from malfunctioning caused by, for example, arcs in a state where the membrane 43 and the short-circuit tab 44 are short-circuited.

Hereinafter, various example embodiments of the prevent invention will be described. The same configurations as in the first example embodiment and the described example embodiment may be omitted, and different configurations from the first example embodiment will now be described.

Figure 7:
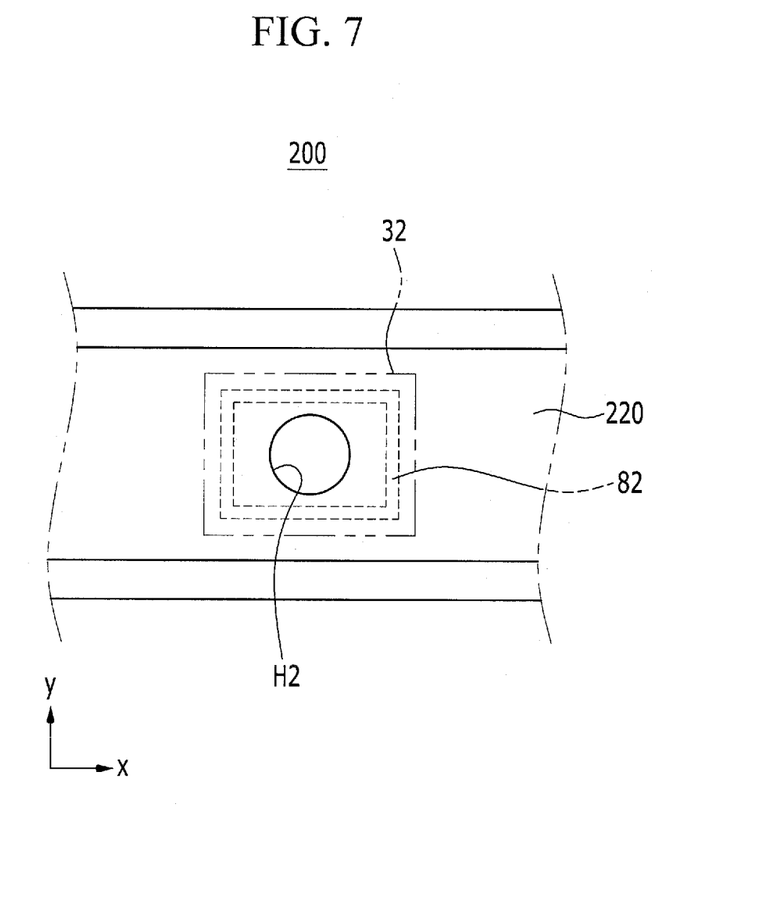
FIG. 7 is a plan view showing a cap plate formed with a bending inducement groove in a rechargeable battery in accordance with a second example embodiment.

FIG. 7 is a plan view showing a cap plate 220 formed with a bending inducement groove 82 in a rechargeable battery 200 in accordance with a second example embodiment. Referring to FIG. 7, in the rechargeable battery 200 in accordance with the second example embodiment, the bending inducement groove 82 may be formed at an internal surface of the cap plate 220 as a single unit or groove.

For example, the bending inducement groove 82 may be formed at an internal surface (e.g., an inner surface) of the cap plate 220 to have a quadrangular shape along a longitudinal direction (e.g., an x-axis direction) of the cap plate 220 and a width direction (e.g., a y-axis direction) thereof intersecting the longitudinal direction (e.g., substantially parallel to the longitudinal direction) outside the terminal opening H2.

In the first example embodiment, when the cap plate 20 bends at the first and second inducement grooves 811 and 812, there exist bending-resistance portions having resistance against the bending at opposite sides of the cap plate 20 along the width direction (e.g., the y-axis direction).

However, in the second example embodiment, the bending inducement groove 82 may be formed to surround a circumference of the terminal opening H2. Accordingly, when the cap plate 220 bends, the bending-resistance portions can be reduced or eliminated.

When an internal pressure of the rechargeable battery 200 is increased, the increased internal pressure reaches the bending inducement groove 82 to bend the cap plate 220 at the bending inducement groove 82

Accordingly, an external portion of the terminal opening H2 is moved upwardly relative to the cap plate 220. The top plate 32 may be separated from (e.g., partially separated from) the cap plate 220 at an outer perimeter thereof. In other words, the top plate 32 and the cap plate 220 may be coupled to (e.g., connected to) each other while being changed from a low resistance state to a high resistance state.

Figure 8:
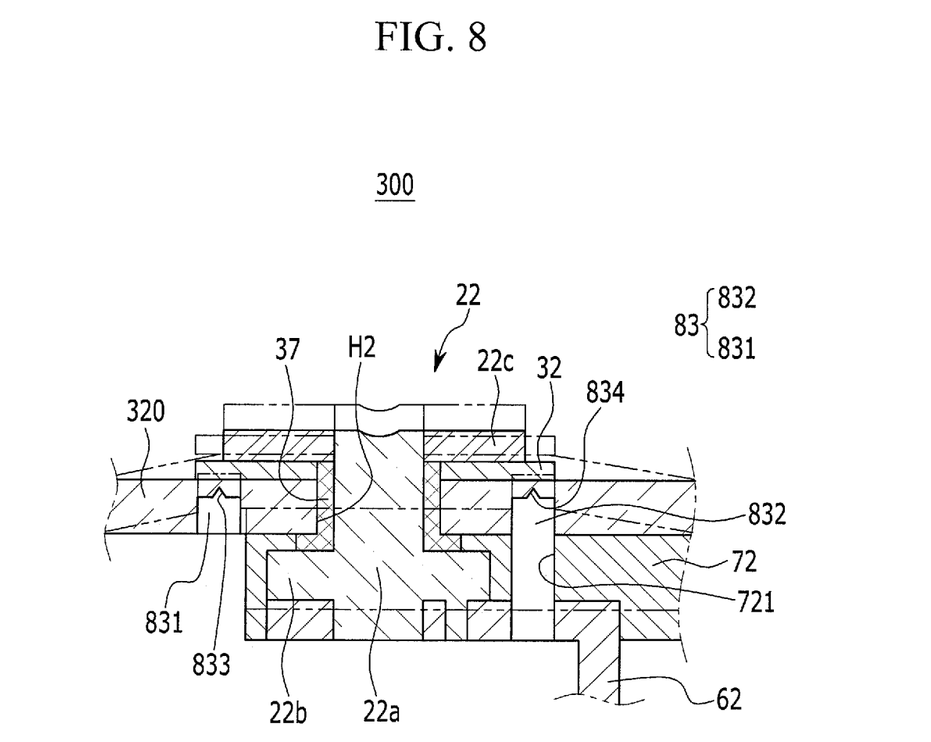
FIG. 8 is a cross-sectional view showing a rechargeable battery in a state in which an internal pressure is increased (e.g., changed from a normal operation state) in accordance with a third example embodiment.
Figure 9:
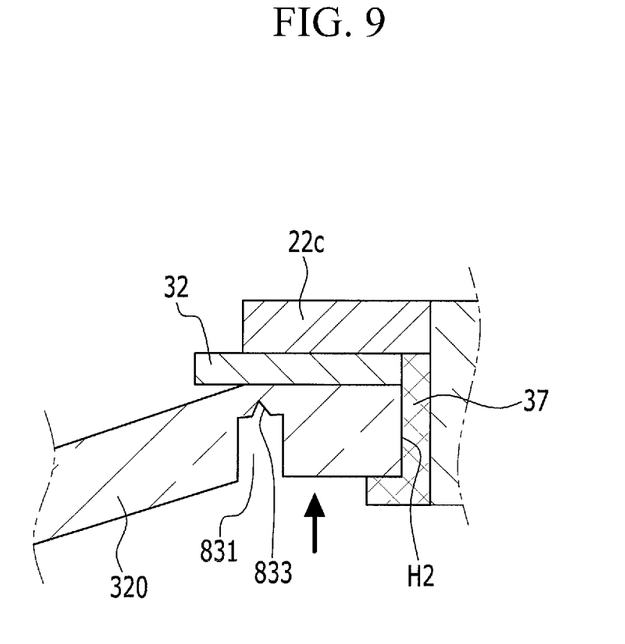
FIG. 9 is a cross-sectional view showing the rechargeable battery shown in FIG. 8 in which a positive electrode terminal is partially separated from the cap plate.

FIG. 8 is a cross-sectional view showing a rechargeable battery 300 in a state in which an internal pressure is increased (e.g., changed from a normal operation state thereof) in accordance with a third example embodiment, and FIG. 9 is a cross-sectional view showing the rechargeable battery of FIG. 8 in which the positive electrode terminal 22 is partially separated from a cap plate 320.

Referring to FIG. 9 and FIG. 10, in the rechargeable battery 300 in accordance with the third example embodiment, a bending inducement groove 83 includes a first inducement groove 831 and a second inducement groove 832 which respectively include notches 833 and 834 formed at an internal surface thereof along the width direction (e.g., the y-axis direction).

In the first example embodiment, internal surfaces of the first and second inducement grooves 811 and 812 may be formed as flat surfaces, thereby having relatively high resistance against bending.

However, in the third example embodiment, the notches 833 and 834 are respectively provided at the internal surfaces of the first and second inducement grooves 821 and 822. Accordingly, when the cap plate 320 bends at the first and second inducement grooves 821 and 822, the notches 833 and 834 serve to further reduce the resistance against the bending of the cap plate 320.

While this disclosure has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims and their equivalents.

| Description of Reference Symbols | |
|---|---|
| 10: electrode assembly | 11: negative electrode |
| 11a, 12a: coated region | 11b, 12b: uncoated region |
| 12: positive electrode | 13: separator |
| 15: case | 20, 220, 320: cap plate |
| 21: negative electrode terminal | 22: positive electrode terminal |
| 21a, 22a: rivet terminal | 21b, 22b: flange |
| 21c, 22c: plate terminal | 31: negative electrode insulator |
| 32: top plate | 36, 37: negative, positive electrode gasket |
| 40: external short-circuiter | 42: short-circuit opening or hole |
| 43: membrane | 44: short-circuit tab |
| 61, 62: negative, positive electrode lead tab | |
| 71, 72: internal insulator | |
| 81, 82, 83: bending inducement groove | |
| 100, 200, 300: rechargeable battery | |
| 201: electrolyte injection opening or hole | |
| 202: vent opening or hole | |
| 203: sealing cap | 204: vent plate |
| 205, 833, 834: notch | 611, 621: current collecting portion |
| 612, 622: connection portion | |
| 623, 721: first, second through-hole | |
| 624: fuse | 811, 831: first inducement groove |
| 812, 832: second inducement groove | H1, H2: terminal opening or hole |

What is claimed is:

1. A rechargeable battery comprising:
    an electrode assembly;
    a case accommodating the electrode assembly at a space therein;
    a cap plate closing an opening of the space in the case;
    a first electrode terminal and a second electrode terminal extending through the cap plate and coupled to the electrode assembly, the second electrode terminal comprising:
        a rivet terminal;
        a plate terminal outside the cap plate and coupled to the rivet terminal; and
        a top plate between the plate terminal and the cap plate; and
    an external short-circuiter comprising a membrane closing and sealing a short-circuit opening in the cap plate and coupled to the second electrode terminal, and a short-circuit tab coupled to the first electrode terminal and separated from the membrane,
    wherein the cap plate comprises a bending inducement groove arranged at least partially overlapping the top plate in a direction from the cap plate toward the electrode assembly, the bending inducement groove being in fluid communication with the space accommodating the electrode assembly.

2. The rechargeable battery of claim 1, wherein the first electrode terminal is a negative electrode terminal, and wherein the second electrode terminal is a positive electrode terminal.

3. The rechargeable battery of claim 1, wherein the second electrode terminal further comprises
    a flange inside the cap plate and coupled to the rivet terminal,
    wherein the rivet terminal is at a terminal opening in the cap plate.

4. The rechargeable battery of claim 3, wherein the bending inducement groove comprises a first inducement groove and a second inducement groove which are respectively formed at opposite sides of the terminal opening along a longitudinal direction of the cap plate.

5. The rechargeable battery of claim 4, wherein the first and second bending inducement grooves extend along a width direction of the cap plate substantially parallel to the longitudinal direction thereof.

6. The rechargeable battery of claim 5, wherein the first inducement groove and the second inducement groove are formed parallel with an internal surface of the top plate.

7. The rechargeable battery of claim 6, wherein each of the internal surfaces of the first inducement groove and the second inducement groove has a notch.

8. The rechargeable battery of claim 5, wherein the first inducement groove and the second inducement groove are respectively formed parallel with sides of the top plate.

9. The rechargeable battery of claim 4, further comprising:
    a second electrode lead tab coupled to a lower end of the rivet terminal,
    wherein the second electrode lead tab comprises a current collecting portion coupled to an uncoated region of the electrode assembly, and a connection portion extending substantially perpendicularly from the current collecting portion and coupled to the second electrode terminal, and
    wherein the connection portion has fuses at opposite sides of a first through-hole, the first through-hole is aligned with the second inducement groove, and the second bending inducement groove is in fluid communication with the space accommodating the electrode assembly via the first through-hole.

10. The rechargeable battery of claim 9, further comprising:
    an internal insulator between the second electrode lead tab and the cap plate,
    wherein the internal insulator has a second through-hole, the second inducement groove being in fluid communication with the first through-hole via the second through-hole.

11. The rechargeable battery of claim 3, wherein the bending inducement groove is formed to have a quadrangular shape along a width direction of the cap plate and along a longitudinal direction thereof that is substantially perpendicular to the width direction.

* * * * *